(12) United States Patent
Kumar

(10) Patent No.: US 6,961,004 B2
(45) Date of Patent: *Nov. 1, 2005

(54) PORTABLE MESSAGING AND SCHEDULING DEVICE WITH HOMEBASE STATION

(76) Inventor: Rajendra Kumar, 3009 Smith Rd., Suite 600, Akron, OH (US) 44333

( * ) Notice: Subject to any disclaimer, the term of this patent is extended or adjusted under 35 U.S.C. 154(b) by 523 days.

This patent is subject to a terminal disclaimer.

(21) Appl. No.: 09/883,463

(22) Filed: Jun. 15, 2001

(65) Prior Publication Data

US 2001/0028311 A1 Oct. 11, 2001

Related U.S. Application Data

(63) Continuation-in-part of application No. 09/057,075, filed on Apr. 8, 1998, which is a continuation of application No. 08/950,212, filed on Oct. 14, 1997, now Pat. No. 6,072,401, which is a continuation of application No. 08/647,669, filed on May 15, 1996, now Pat. No. 5,696,496, which is a continuation of application No. 08/223,464, filed on Apr. 4, 1994, now Pat. No. 5,648,760, which is a continuation of application No. 07/805,302, filed on Dec. 10, 1991, now abandoned.

(51) Int. Cl.[7] .............................................. H04Q 1/00
(52) U.S. Cl. .................................... 340/825.56; 341/23
(58) Field of Search ...................... 340/825.25, 825.22, 340/309.4, 7.54; 369/25.01; 700/14; 708/112; 710/62

(56) References Cited

U.S. PATENT DOCUMENTS 3,999,050 A     12/1976  Pitroda
4,534,012 A  *  8/1985   Yokozawa ..................... 700/14
4,841,387 A     6/1989   Rindfuss
4,890,258 A  *  12/1989  Tsugei et al. ................. 708/112
4,912,640 A     3/1990   Tsugei
4,943,868 A     7/1990   Yoshinaga et al.
5,008,854 A     4/1991   Maeda et al.
5,281,962 A  *  1/1994   Vanden Heuvel et al. . 340/7.54
5,459,702 A  *  10/1995  Greenspan ................ 369/25.01
5,664,228 A  *  9/1997   Mital .......................... 710/62

FOREIGN PATENT DOCUMENTS

DE           3130010 A1       7/1981
EP         0 414 566 A2       8/1990
EP         0 438 298 A2       1/1991
WO       PCT/US86/02239     11/1987

* cited by examiner

Primary Examiner—Brian Zimmerman
(74) Attorney, Agent, or Firm—Sand & Sebolt

(57) ABSTRACT

A portable device (10) for selective message recordation and playback and scheduling includes a portable unit (11) and an optional homebase station (12). Portable unit (11) includes a housing (15), unit controller (20), tactile input mechanism (40), audio processor (60) and video processor (80). Portable unit (11) allows textual, audible and visual message inputs and their selective playback based on time or other preselected textual, audible or visual stimulus. A selectively detachable stylus (51) may be removed to engage a touch panel (50) for making operational selections and entering information. Optional homebase station (12) may include a variety of features for supporting and supplementing those of handheld unit (11), such as a floppy drive (112) message memory, input keys (114), a battery charging circuit (115) and an external communication circuit (117).

26 Claims, 9 Drawing Sheets

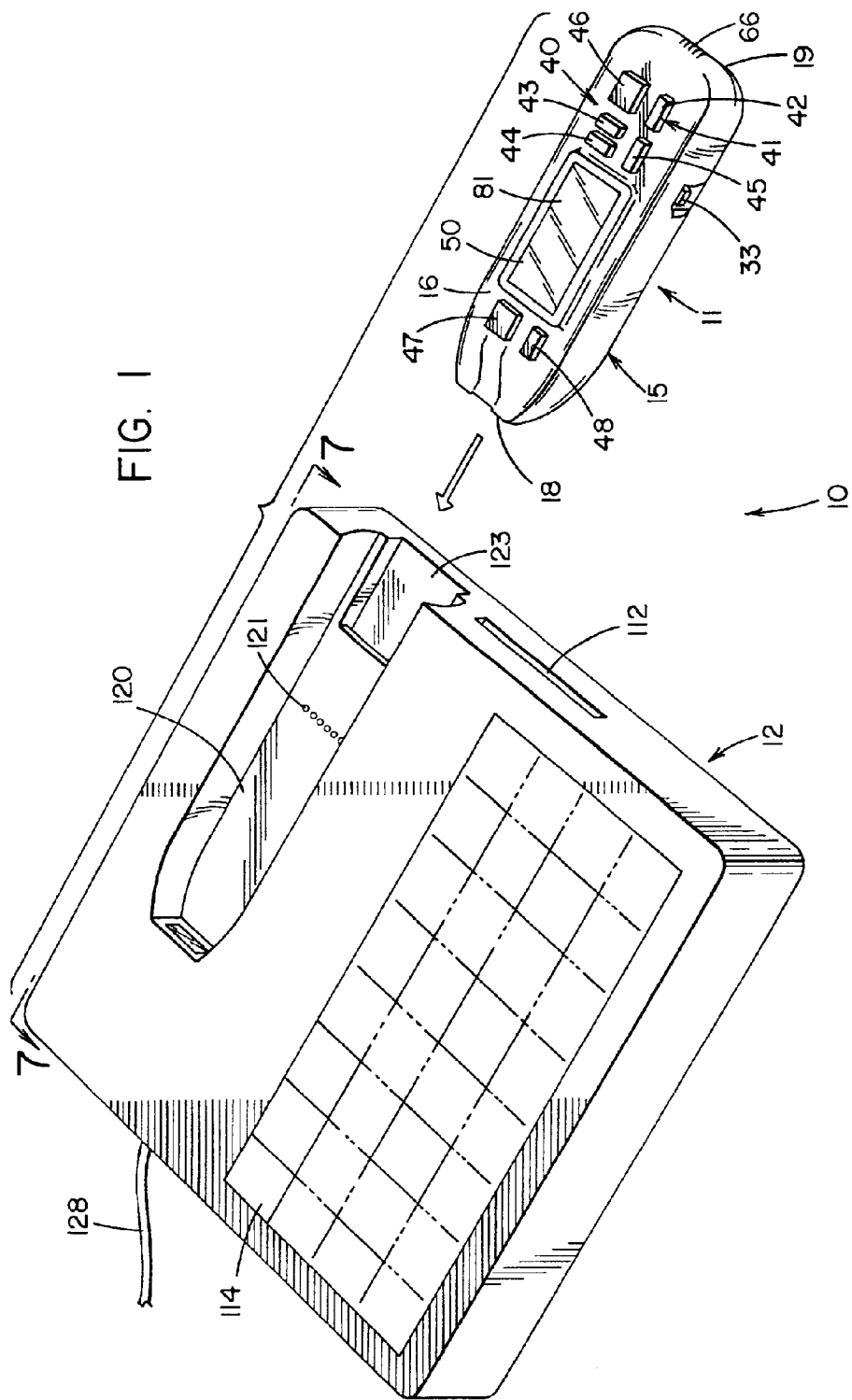

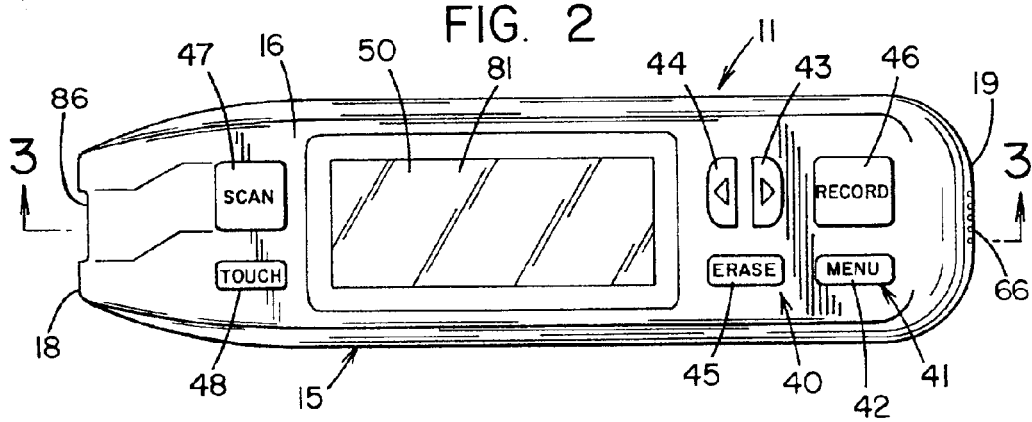
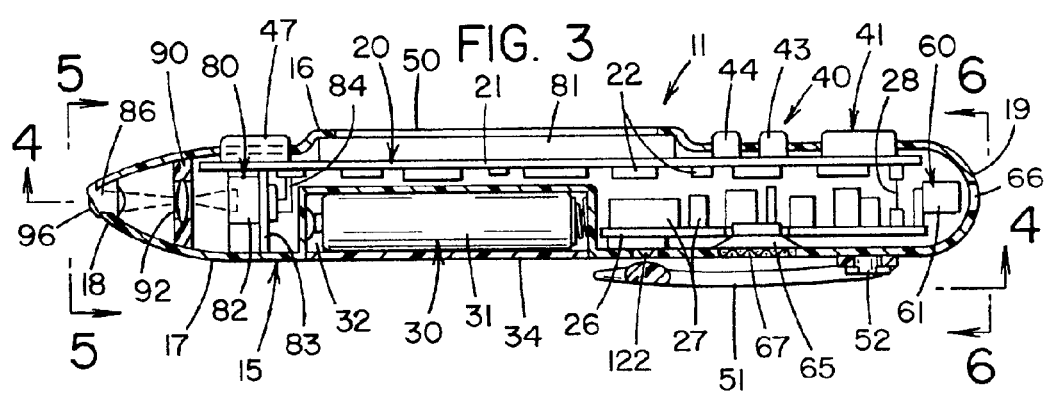
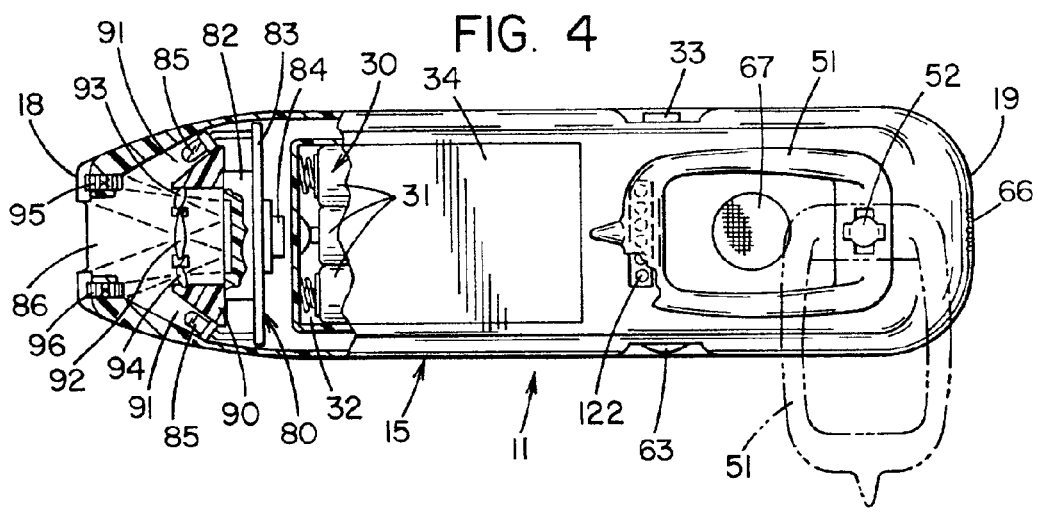

PORTABLE MESSAGING AND SCHEDULING DEVICE WITH HOMEBASE STATION

CROSS REFERENCE TO RELATED APPLICATIONS

The present application is a continuation-in-part of patent application Ser. No. 09/057,075 filed Apr. 8, 1998 which is a continuation of Ser. No. 08/950,212, filed Oct. 14, 1997, now U.S. Pat. No. 6,072,401 which is a continuation of U.S. Ser. No. 08/647,664 filed May. 15, 1996, now U.S. Pat. No. 5,696,496 which is a continuation of U.S. Ser. No. 08,223,464 issued Apr. 4, 1994, now U.S. Pat. No. 5,648,760 which is a continuation of Ser. No. 07/305,302, filed Dec. 10, 1991, abandoned.

BACKGROUND OF INVENTION

1. Technical Field

The present invention relates in general to portable devices for receiving, and storing and selectively recalling messages. More particularly, the present invention pertains to devices for recording and playback of messages and reminders. More specifically, the present invention relates to portable devices sometimes referred to as message recorders and organizers.

2. Background Information

Over the years a wide variety of devices, sometimes loosely referred to as organizers, have been used to assist the individual in retaining and sequentially recalling thoughts or other messages, and retaining and furnishing timely reminders of matters requiring future attention. For example, U.S. Pat. No. 4,228,470 to Rahamin et al., and the "OA Secretary" made by Ky-Tek Industrial Co., Ltd. of Taipei Taiwan Republic of China, present non-portable electronic reminder systems in which microphone input audio messages are stored and subsequently played back at preselected times entered through a keyboard. U.S. Pat. No. 4,302,752 to Weitzler discloses another electronic reminder device for receiving audio input, storing the audio input on separate tracks of audio tape, and playing back the audio input at preselected times associated with each separate track.

Storage and selective retrieval of typewritten and manually entered notes and messages have also been the subject of organizers. A handheld electronic device for storing keyboard entered personal information such as telephone numbers, appointments and one's agenda, and furnishing an audio alarm or display at the time of an appointment or other preselected time has been shown in U.S. Pat. No. 4,847,760 to Yagi. U.S. Pat. No. 4,968,065 to O'Brien depicts a manual notetaking system in which a note-card is lined on one side to facilitate writing and shaped to facilitate carrying in a shirt-pocket.

Two additional U.S. Pat. No. 4,785,357 to Dreyfus et al. and U.S. Pat. No. 4,471,218 to Culp envision acquiring visual information for storage and later retrieval. In the Dreyfus et al. patent a pocket photocopier capable of scanning, storing and printing a portion of a document includes a CCD array and an incremental wheel which furnishes a time base for the reading interval as the wheel rolls without sliding. The scanned matter is stored in a memory and printed out by a built in printer. The Culp patent provides a portable data entry terminal wand having a barcode scanner that reads data into its memory and, when the wand is inserted into an optical-coupled interface module transfers the data in the wand memory to a more complex base terminal.

Because people give and receive information using all their senses, an organizer must be comprehensive to be most useful. In other words, the most desirable organizer would allow messages and reminders be entered and played back visually as by scanning, auditorialy by speech and manually by touch. But functional comprehensiveness is not enough. Because people are constantly developing messages and requiring reminders, the most desirable organizer must also be highly compact for easy carrying and use. As a practical matter an organizer should easily fit into a shirt pocket.

The various devices noted above have failed miserably at being both functionally comprehensive and compact. No device has included sufficient functionality to allow input and output of messages and reminders in the optimal variety of sensory modes. Additionally, as functionality has increased, such devices have become so large, cumbersome and unwieldy as to require fixed operation, severely limiting the usefulness of any organizer.

Equally significant, such devices have been difficult and convoluted to understand, learn and operate. Indeed, many devices have been so complex as to preclude use by all but the most technically adventurous and knowledgeable. This complexity and intractability has been further exasperated with greater functionality. For example, more recently, portable, handheld devices have been disclosed or become commercially available combining cellular or other mobile telephone devices with certain functionality of the personal computer. Typical of these devices is that disclosed in U.S. Pat. No. 5,180,632 to Paajanen et al., the Synergy Smart Phone Add-on available from Philips Consumer Communications L.P. of Parsippany, N.J., the Genio available from Toshiba Corporation of Tokyo, Japan, and the Nokia 9000 available from OY Nokia AB of Helsinki, Finland.

In short, such devices are not functionally comprehensive, sufficiently compact or easy to work.

SUMMARY OF THE INVENTION

It is, therefore, an object of the present invention to provide a portable, device for organizing messages and reminders that receives and plays back messages in a functionally comprehensive variety of sensory formats.

It is another object of the present invention to provide a device, as set forth above, wherein messages and reminders may be received visually as by scanning, auditorialy by speech and manually by touch, and may be played back visually or auditorialy.

It is still another object of the present invention to provide a device, as set forth above, which is adapted to facilitate handheld operation and carrying in a shirt-pocket.

It is still a further object of the present invention to provide a device, as set forth above, that is easy to understand, learn and operate.

It is an additional object of the present invention to provide a device, as set forth above, that allows users to select directly the desired operation of the device without having to individually bypass a plurality of selections.

It is still an additional object of the present invention to provide a device, as set forth above, that seamlessly allows users the added functionality of a cellular or other portable telephone device.

These and other objects and advantages of the present invention over existing prior art forms will become more apparent and fully understood from the following description in conjunction with the accompanying drawings.

In general, a personal organizer and messaging device includes a unit dimensioned for handheld grasping and carrying substantially within a shirt pocket, and a portable station. The unit includes an image scanner for scanning printed material and creating a signal, a processor for controlling the receipt of the signal, storing the signal, and non-sequentially selectively recalling the signal, and, a display for receiving information from the processor and from the image scanner. The portable station includes an auxiliary display and is in selective engagement with the unit.

A personal organizer and messaging device includes a handheld unit dimensioned for handheld grasping and carrying substantially within a shirt pocket, and a portable station. The handheld unit includes audio input means for receiving and recording an audio message and generating a representative audio message signal, memory means for storing the audio message signal, processor means for controlling the receipt of the audio message signal, storing the audio message signal, and non-sequentially selectively recalling the audio message signal, audio output means for receiving the non-sequentially selectively recalled audio message signal and for playing back the non-sequentially selectively recalled audio message, and a handheld housing. The handheld housing carries the audio input means, the memory means, the processor means, and the audio output means. The portable station includes an auxiliary display and is in selective engagement with the unit.

A personal organizer and messaging device includes a unit dimensioned for handheld grasping and carrying substantially within a shirt pocket, and a portable station. The unit includes writing means for receiving a plurality of written messages and generating written message signals, memory means for digitally storing a written message, processor means for controlling the receipt and digital storage of the written message signals and non-sequentially and selectively recalling for playback of one of the written messages, display means positioned beneath the writing means for receiving and displaying the non-sequentially and selectively recalled written message through the writing means, and a handheld housing for carrying the writing means, the processor means and the display means. The portable station includes an auxiliary display and is in selective engagement with the unit.

BRIEF DESCRIPTION OF THE DRAWINGS

FIG. 1 is a top perspective view of an exemplary device in accordance with the present invention showing both a portable, handheld unit and a homebase station.

FIG. 2 is a top view of the exemplary portable, handheld unit shown in FIG. 1.

FIG. 3 is a vertical sectional view of the exemplary portable, handheld unit shown in FIGS. 1 and 2 taken substantially along line 3—3 shown in of FIG. 2.

FIG. 4 is a bottom view of the exemplary portable, handheld unit shown in FIGS. 1 and 2 taken substantially along line 4—4 shown in FIG. 3 showing in breakaway the scanning apparatus and a portion of the power supply therein, and showing in phantom the release position of a pocket clip/stylus.

DESCRIPTION OF THE PREFERRED EMBODIMENT

Figure 5:
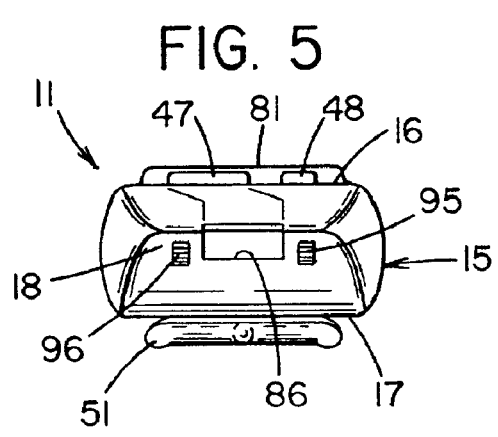
FIG. 5 is a left side view of the exemplary portable, handheld unit shown in FIGS. 1 and 2 taken substantially along line 5—5 shown in FIG. 3.
Figure 6:
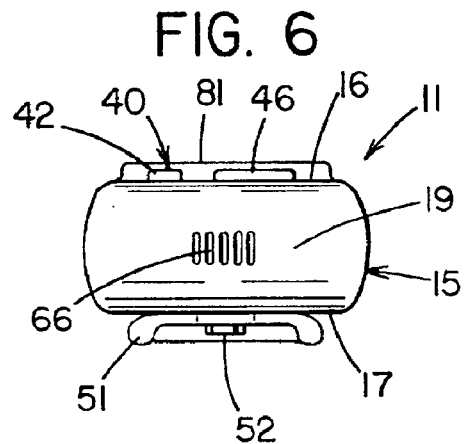
FIG. 6 is a right side view of the exemplary portable, handheld unit shown in FIGS. 1 and 2 taken substantially along line 6—6 shown in FIG. 3.

FIG. 1 presents in perspective an exemplary device in accordance with the present invention, generally indicated by the numeral 10, for selective message recordation and playback and scheduling. Device 10, best seen overall in FIGS. 1 and 2, includes a portable unit 11 and an optional homebase station 12. Portable unit 11, better seen in FIGS. 2 through 6, broadly includes housing 15, unit controller 20, tactile input mechanism 40, audio processor 60 and video processor 80. Portable unit 11 allows textual, audible and visual message inputs and their selective playback based on time or other preselected textual, audible or visual stimulus.

Housing 15 may be formed by molding or other acceptable means of a suitable material such as a rigid plastic suitable to integrally carry all the components in a substantially rectangular block having an upper shell 16 and a lower shell 17, a first end 18 and a second end 19. The dimensions and styling of housing 15 should be about what may be comfortably grasped in a human operator's hand and fit within a conventional shirt pocket for ease of use carrying, e.g., about 1.8 inches (4.6 cm) wide, 6.25 inches (15.9 cm) long and 0.8 inches (2.0 cm) thick with rounded edges.

Figure 8:
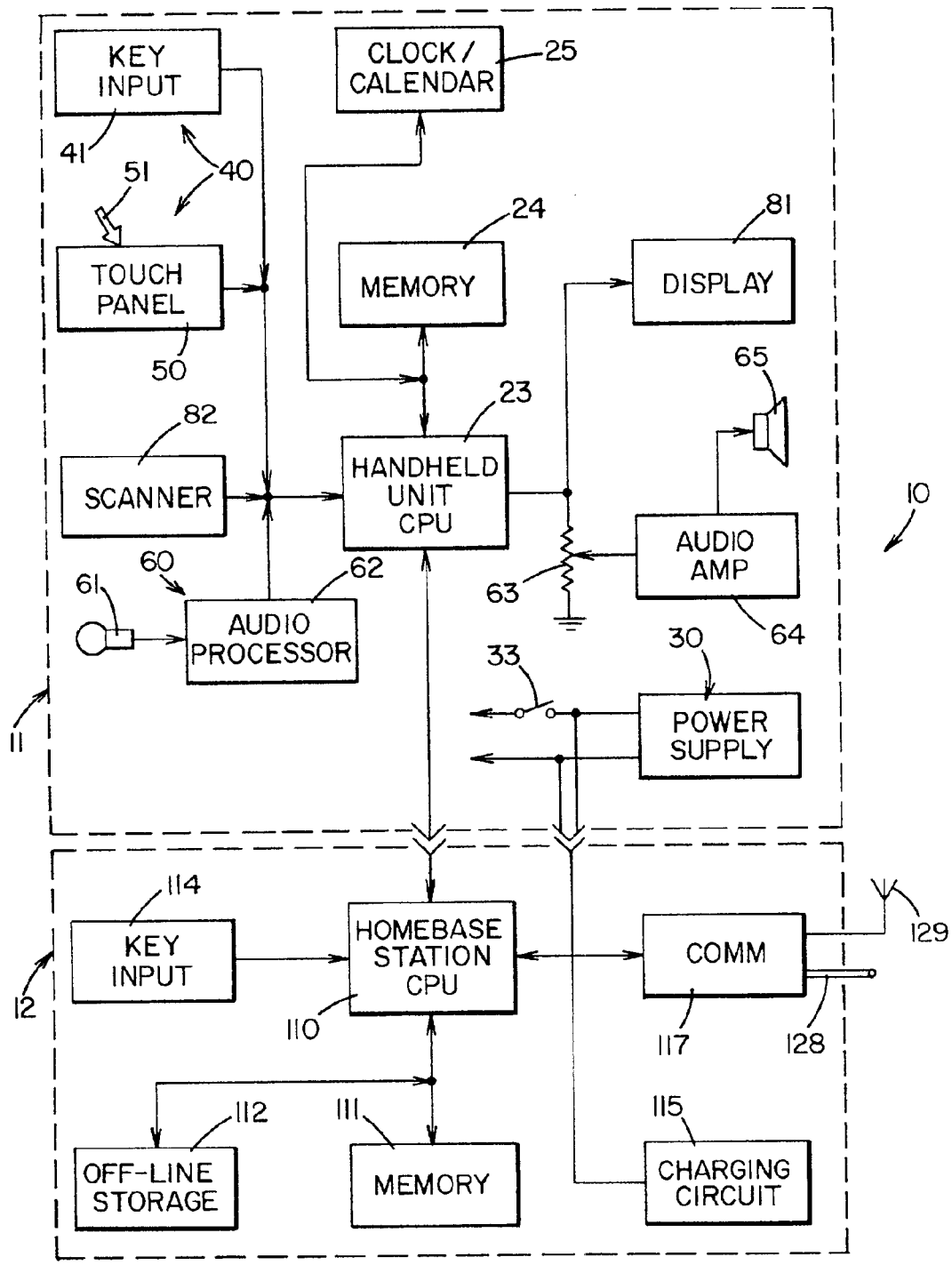
FIG. 8 is a block diagram of the functional components of the exemplary portable unit shown in FIG. 1 and the exemplary portable, homebase station shown in FIG. 2.

Unit controller 20 includes, as best appreciated in FIGS. 3 and 8, a main printed circuit (PC) board 21 carried by upper shell 16 having a plurality of primarily surface mounted devices (SMDs) 22 mounted on the side thereof furthest from upper shell 16, and a portion of the tactile input mechanism 40 and video processor 80 as hereinafter detailed mounted on the side thereof adjacent to upper shell 16. The SMDs mounted on PC board 21 may include a microprocessor or microcontroller 23, memory 24, and, to the extent not provided on-board microcontroller 23, a clock/calendar circuit 25 for storing the current date and time, analog to digital (A/D) and digital to analog (D/A) converters, input/output and display controllers and video processor circuits and components.

Unit controller 20 further includes a second PC board 26 carried by lower shell 17 having a plurality of primarily non-SMDs 27 such as power supply components mounted on the side thereof furthest from lower shell 17, the audio processor 60 as hereinafter detailed mounted in part on the side thereof adjacent lower shell 17, and an on-board power supply 30. A suitable electrical cable 28 may be employed to interconnect the two PC boards. On-board power supply 30 may include, for example, a plurality of batteries 31 mounted in a compartment 32 that may be integrally formed in lower shell 17 and have cover 34, and an on-off power switch 33 that may be mounted on second PC board 26 so as to extend partially through the side of housing 15.

Microcontroller 23 may be any conventional microcontroller suitable for processing limited speech recognition and graphics display, preferably having low-power consumption and various functions including at least limited digital signal processing, A/D and D/A conversion, such as the Model Z86C94 microcontroller manufactured by Zilog, Inc. of Campbell, Calif. Memory 24 may be any suitable digital memory of sufficient capacity to store any extent of program not onboard microcontroller 23 and the desired number and length of voice messages discussed below. 512K Bytes of CMOS static RAM has been found adequate to retain over 200 scanned or written messages, over 30 four-second long verbal messages or a mix thereof.

Tactile input mechanism 40 includes a plurality of input keys 41 such as menu key 42, forward arrow key 43, reverse arrow key 44, erase key 45, record key 46, scan key 47 and touch key 48, all mounted to PC board 21 as described above. Tactile input may also be furnished via resistive touch panel 50 which will allow input via touching of a display to be discussed below or input written thereon by a substantially rectangular stylus 51 selectively detachably mounted to the outside of lower shell 17 by suitable means such as bayonet mount 52. One acceptable analog resistive touch sensor with an active area of appropriate dimensions may be purchased from Graphics Technology Inc. of Austin, Tex. doing business as Touch Technology. Use of stylus 51 allows direct selection among the plurality of choices that may be presented on the display, eliminating the need for multiple keystrokes of keys 43 and 44 to move a cursor over undesired choices and greatly facilitating ease of operation of device 10.

Audio processor 60 includes a microphone 61 for audio input, an audio processor circuit 62 receiving the signal from microphone 61 and whose output is received by the microcontroller 23, a volume control potentiometer 63 electrically connected to audio processor circuit 62 and an audio amplifier 64, and a speaker 65 for audio output receiving the output from audio amplifier 65. Microphone 61, audio processor circuit 62, volume control potentiometer 63, audio amplifier 64 and speaker 65 all may be mounted on second PC board 26 such that microphone 61 is in alignment with sound aperture 66 in the second end 19 of both shells of housing 15, volume control potentiometer 63 extends partially through the side of housing 15, and speaker 65 is aligned with sound aperture 67 in lower shell 17. The central core of stylus 51 may be removed to facilitate the passage of sound therethrough when stylus 51 is mounted upon lower shell 17.

Video processor 80 includes a graphics display 81 preferably of higher resolution and low power consumption. One such device is the graphic type supertwist dot matrix liquid crystal display modules of either the reflective or, if economical, backlight type like that manufactured by Seiko Instruments USA Inc. of Torrance Calif. Graphics display 81 may be mounted to the side of main PC board 21 adjacent to upper shell 16 such that its active area is visible through an aperture in upper shell 16.

Video processor 80 may further include an optical scanner 82 such as a CCD array, like the Model LZ2018 512-pixel line sensor commercially available from Sharp Electronics Corporation of Mahwah, N.J., mounted to a third PC board 83. Third PC board 83, in turn may be mounted perpendicular to and in main PC board 21 so that the CCD array 82 is centrally disposed within and faces the first end 18 of housing 15, and may be electrically interconnected thereto by right angle connector 84. Two light emitting diodes (LEDs) 85 or other suitable light sources are also mounted peripherally on third PC board 83 adjacent the opposite interior sidewalls of housing 15 oriented to project light therefrom toward a scanning aperture 86 in the first end of housing 15.

A lens mounting assembly 90 is fixedly mounted between upper shell 16 and lower shell 17 such that the ends thereof form light channels 91 directing the light from LEDs 85 through scanning aperture 86 outside unit 11. Lens mounting assembly also carries a first centrally disposed lens 92 for focusing the bulk of the light reflected in through scanning aperture 86 from the scanning surface upon CCD array 82, and two peripherally disposed lenses 93, 94 for focusing a small portion of light reflected from two scan wheels 95, 96 as discussed directly below.

It should be appreciated that inasmuch as scanning with handheld unit 11 is performed manually, the scan rate can vary significantly and some method is required to determine the actual scan rate. One such method is shown in U.S. Pat. No. 4,785,357 to Dreyfus et al and employs two rotatable, stripped scan wheels 95, 96 mounted on housing 15 at either end of scanning aperture 86. Scan wheels 95, 96 intercept small portions of the light from LEDs 85 and reflect to the periphery of CCD array 82 a light modulated pulse train whose frequency and duty cycle is directly proportional to the scan rate. Scanning aperture 86 may be angled to further facilitate scanning with unit 11 held at an optimal angular orientation with respect to the scanning surface.

Figure 7:
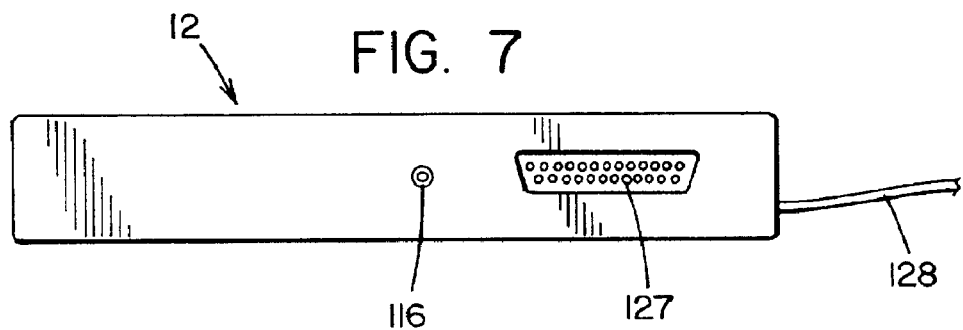
FIG. 7 is a rear view of the exemplary homebase station shown in FIG. 1 taken substantially along line 7—7 shown in FIG. 1.

Homebase station 12, illustrated in perspective in FIG. 1 and in rear elevation in FIG. 7, may include a variety of features for supporting personal organization and messaging in addition to those of handheld unit 11. Homebase station 12 may include its own microprocessor or microcontroller 110, memory 111, off-line storage device 112 such as a small form factor floppy disk drive, input keys 114, charging circuit 115 with external jack 116 for the rechargeable power supply of handheld unit 11, and communication circuit 117.

Homebase station 12 may preferably further include a cradle 120 into which handheld unit 11 may slide in only one orientation, thereby allowing power and information transfer as hereinbelow further explained. Homebase station 12 may include a miniature multi-contact I/O connector 121 which removably matingly engages a like connector 122 included in the handheld unit 11 second PC board 26 and extending through lower shell 17 of housing 15 in proximity to the pointer end of stylus 51. A rectangular bay 123 is cutout of cradle 120 to allow stylus 51 to pass thereunder and bias connectors 121 and 122 into firm electrical engagement when handheld unit 11 is secured within cradle 120.

Figure 10:
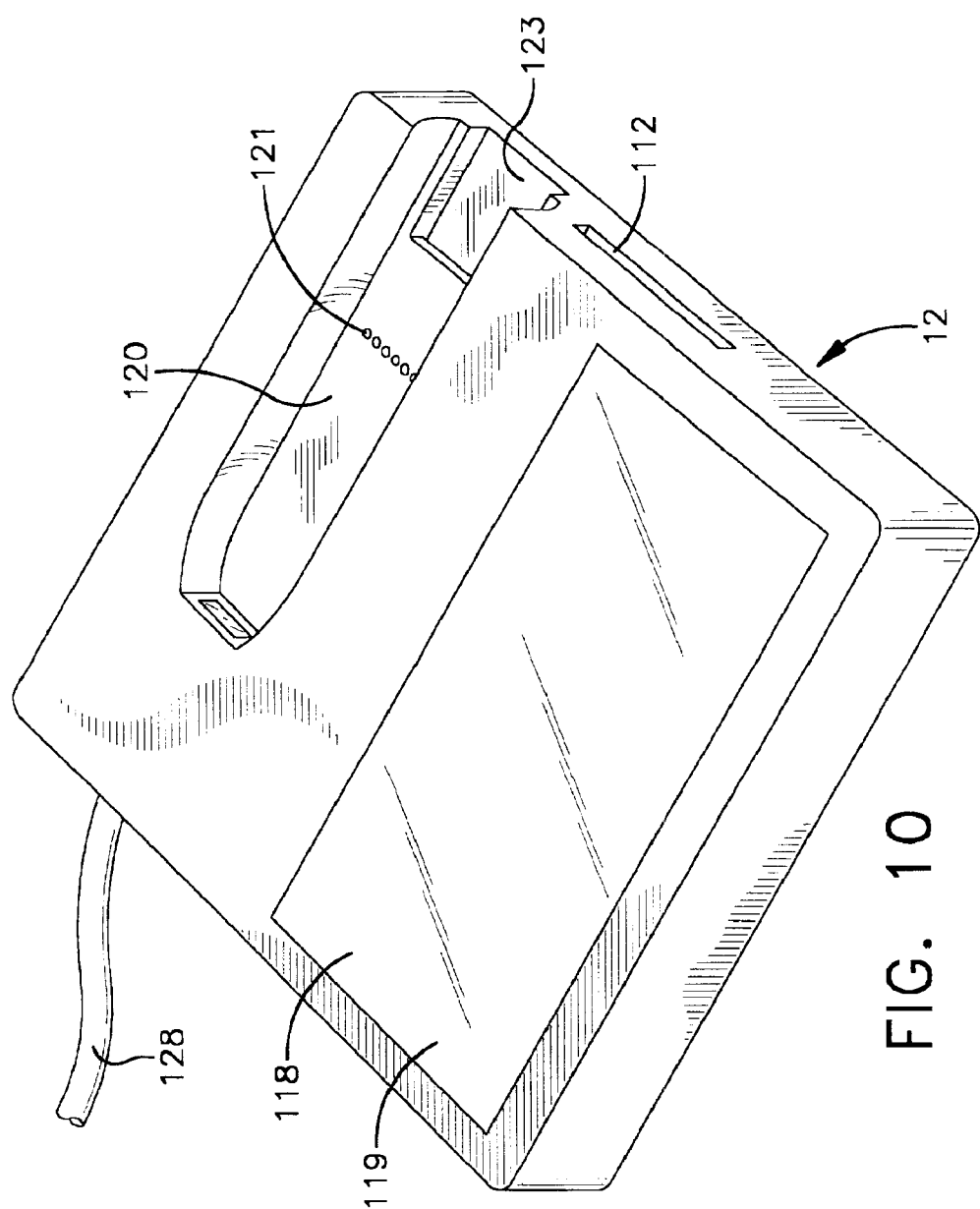
FIG. 10 is a perspective view of the exemplary portable, homebase station shown in FIG. 1 modified to include a display instead of a keyboard.

Homebase station 12 allows supplemental key input to portable unit 11, supplemental message storage, communications with external devices, and charging of batteries 31 in portable unit 11. As seen in FIG. 10, homebase station 12 may, if furnished with a display 118, provide supplemental video output in a larger format than that available from pocket unit 11. Display 118 may be alternative or in addition to key input, and may be further enhanced with a resistive touch panel 119 comparable to touch panel 50 in portable unit 11.

The input keys 114 of homebase station 12 may be a touch keypad such as an 8×4 key array with interchangeable overlays, a QWERTY keyboard with standard travel keys, or such other tactile input mechanism as may be desired. Solely by way of example, where a key array is employed one overlay may have symbols representative of preselectable stimulus or responses as further detailed below, while another overlay may present standard alphanumeric characters.

Data and other information communication between homebase station 12 and handheld unit 11 may be achieved through selected contacts in connectors 121 and 122 when handheld unit 11 is fully inserted into cradle 120. Homebase 12 may include conventional communication circuitry for external communication, such as an RS-232C interface, and a hardwired DB-25 style I/O connector 127 for connection to a communication cable 128, and/or a radio or other broadcast frequency circuit and antenna 129.

Operation of device 10 may be most readily understood if it is recalled that the two related overall roles of unit 11 are to furnish flexible messaging and personal scheduling capabilities. Thus, unit 11 possesses two basic modes of operation: messages in a variety of formats may be input, played back and edited in what may be called the "notes" mode; the occurrence of preselected notes or events (i.e., "causes") triggers presentation of further preselected messages and/or generation of preselected events (i.e., "effects") in what may be called the "cause-effect" mode,.

Unit 11 allows for input of messages in a variety of sensory formats including visual by scanning using video processor 80, audio by speaking using audio processor 60, and alphanumeric by keying or writing using resistive touch panel 50. Messages may be output and effects selected from among a similar variety of formats, including visual and/or alphanumeric using display 81, and audio by recorded speech using audio processor 60.

Unit 11 permits a variety of triggering causes including the occurrence of a preselected time, day and/or date (which may be called a "clock" cause), the input by scanning or touch panel 41 selection of a preselected visual or alphanumeric image (which may be called an "icon" cause), the input of a preselected audio message (which may be called a "voice" cause), the lapse of a preselected time interval (which may be called a "timer" cause), the entry by touch panel 50 of a preselected alphanumeric character string (which may be called a "text" cause), and the receipt by unit 11 from its homebase or other external source of a preselected alphanumeric character string (which may be called a "machine" cause). Effects may be selected from among a similar variety of formats, including presentation on display 81 of time, day and/or date (which may be called a "clock" effect), presentation on display 81 of a video message (which may be called an "icon" effect), generation of an audio message (which may be called a "voice" effect), presentation on display 81 of the current lapsed time of the timer (which may be called a "timer" effect), presentation on display 81 of a preselected alphanumeric character string (which may be called a "text" effect), and the transmission of a preselected alphanumeric character string (which may be called a "machine" effect).

Figure 9:
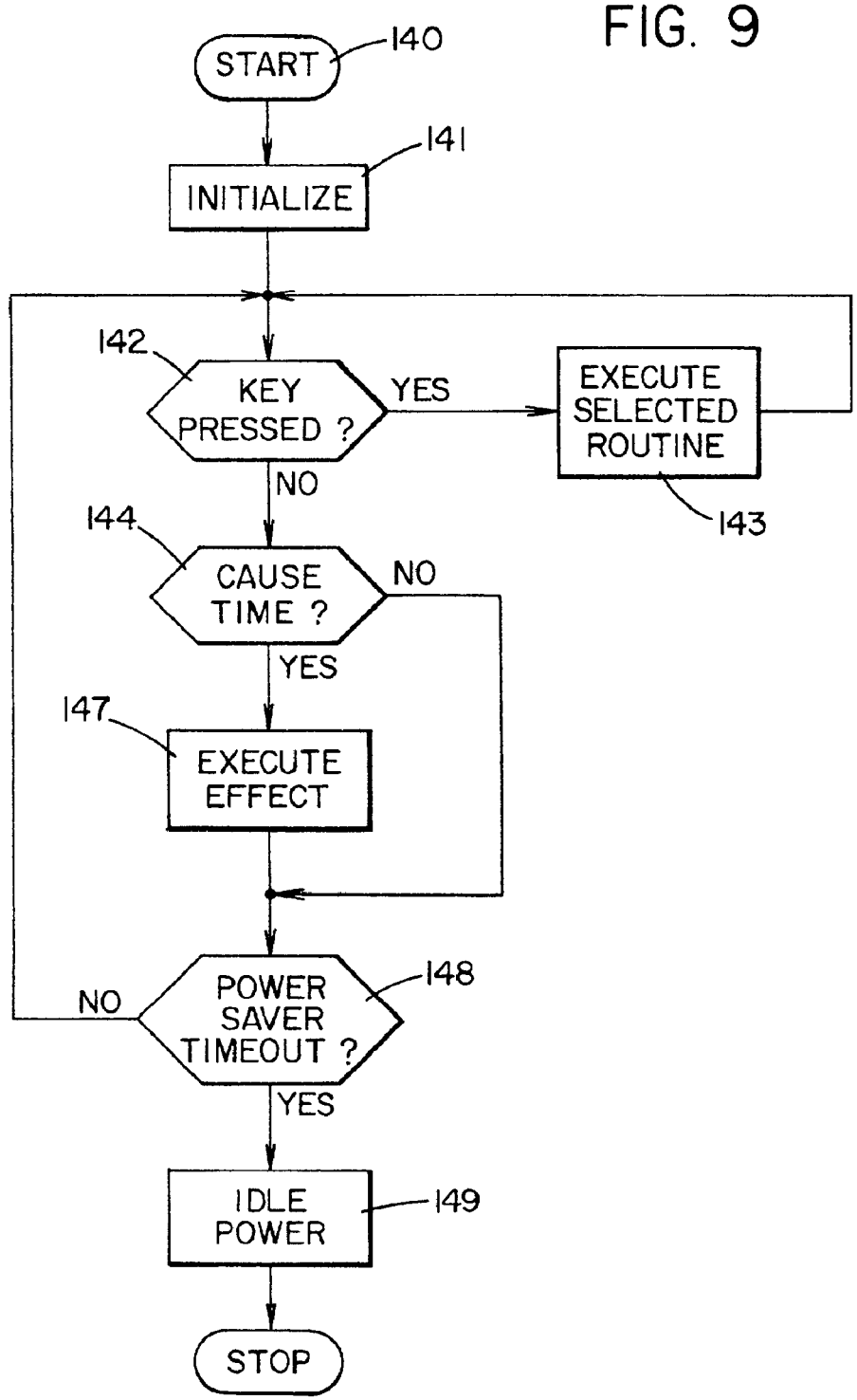
FIG. 9 is a top level flow chart depicting the operation of the exemplary device shown in FIG. 1.

In one exemplary implementation of such operation unit 11 may default to one mode of operation, such as the notes mode, and allow for operation in the other mode (cause-effect) by pressing a key (menu key 42). FIG. 9 presents a top level flow chart of an exemplary operation of unit 11 in accordance with the present invention, which starts in block 140 upon activation of unit 11 either by pressing on-off power switch 33, or by clock/calendar 25 upon occurrence of a preselected clock or timer cause. After performing various known initialization procedures (block 141), all keys are tested for selection (block 142). If a key 41 is pressed the corresponding routine is executed as described herein (block 143). If no key is pressed, the current time is checked and compared to any preselected clock or timer cause (block 144), and if equal the preselected effect executed (block 147). If not, unit 11 checks if a user preselected period of inactivity has lapsed (block 148), and if so conserves power by switching microcontroller 23 to an "idle" condition (block 149). In the idle condition power is maintained to any volatile memory and clock/calendar 25.

While in the notes mode, it is possible to input four types of messages as described above: scanned, spoken, written or keyed. Scanned messages may be input by pressing the scan key 47, activating scanner 80. Images may be scanned as described above, echoed on display 81 and stored when in acceptable condition by pressing record key 46. Unit 11 may optionally allow editing of scanned messages prior to recording such as by using stylus 51 for pixel alteration or arrow keys 43, 44 for scaling.

Audio messages, written and keyed alphanumeric messages may be respectively input during the notes mode when no other notes are in progress by pressing record key 46 and speaking into microphone 61, pressing touch key 48 once, and pressing touch key 48 twice in quick succession. Appropriate screens may be presented to the user to facilitate identifying and processing the selected input, which may be stored when in acceptable condition by pressing record key 46.

Messages may be played back during the notes mode when no other notes are in progress by pressing either forward arrow key 43 or reverse arrow key 44, and may be deleted by pressing erase key 45 for several seconds during playback of the unwanted message. Since messages are stored digitally, a new message may be inserted preceding the last recorded or played message by simultaneously pressing both arrow keys 43, 44.

Pressing menu key 42 presents a menu screen on display 81 listing the allowed selections. Desirable selections may include "set-up cause-effect", "set clock", "erase all" and "set others", and may be chosen by the user with touch panel 50. If "set-up cause-effect" is selected, display 81 may present a series of menus allowing selection of the type of triggering event desired, the appropriate specific triggering conditions, and the type of effect desired. For example, if a user choose the "clock" selection from a cause menu, display 81 would next prompt the user for a date, day and/or time at which the desired effect is to be carried out, followed by an effect menu presenting the above described selection of effects. If the user chooses "voice" as the desired effect, the user would be prompted for the audio message. Thereafter, at the preselected date, day and/or time that message would be played back automatically. Thus, completing one or more "set-up cause-effect" procedures selects the cause-effect mode.

"Set clock" may present a display 81 screen for setting the internal clock of unit 11 to the current date, day and time. "Erase all" may be furnished to conveniently erase all recorded messages causes and effects. The "set others" option may be furnished to specify other user desirable functions such as the inactivity period after which idle operation is begun. Other user desirable functions may include a message "write-protection" switch, which when activated precludes alteration of existing messages and input of additional messages, and a password to preclude modification to settings in handheld unit 11 by activation of main menu screen or the note mode screen by other than an authorized user.

It should be appreciated that homebase station 12 may be used to facilitate the selection, storage and editing in unit 11 of desired messages, causes and effects. Selection of "machine" from the cause menu allows receipt of an alphanumeric character string directly from homebase station 12, as noted hereinbefore. A modem or other communication interface may be electrically connected to I/O connector 127 for indirect communication with any device capable of such communication. Floppy disk drive 112 may be used to store a significantly greater number of messages, causes and effects.

The versatility of homebase station 112 permits unit 11 to be configured to best address the desired application. Where, for example, unit 11 is to be utilized by an ambulatory handicapped person strictly a portable, intelligent reminder, unit 11 may be limited in features to just those of interest, say audio output and display.

A further embodiment of the present invention that integrates the functionality of a cellular or other portable wireless voice and data telephone is presented in FIGS. 10 through 14, and is indicated generally with the numeral 210. Device 210, best seen overall in FIGS. 11 and 12, includes a portable, handheld shirt-pocket-sized unit 211 (pocket unit 211) and an optional portable homebase station 212. Pocket unit 211 and homebase station 212 are highly similar in structure and functionality to that of portable unit 11 and homebase station 12, respectively. Accordingly, like reference numerals shall be used to identify like elements; only elements having different structure or operation will be discussed and identified with different reference numerals.

Figure 13:
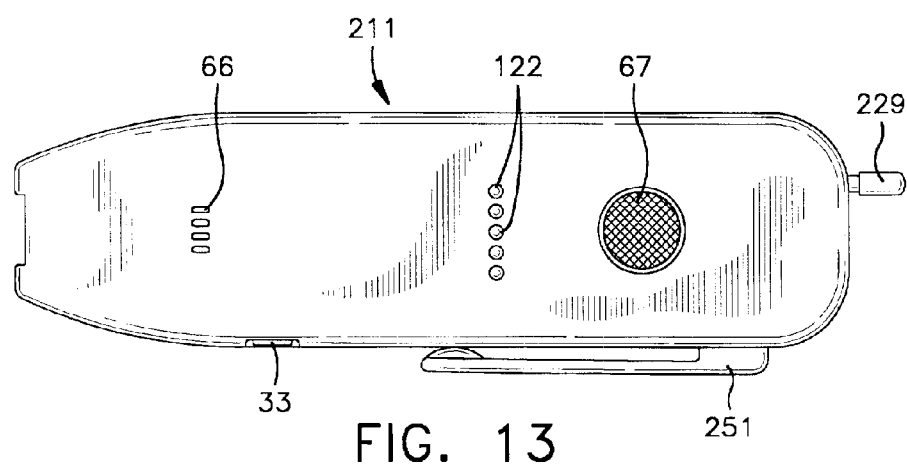
FIG. 13 is a bottom view of the modified, exemplary pocket unit shown in FIGS. 12 and 13.
Figure 12:
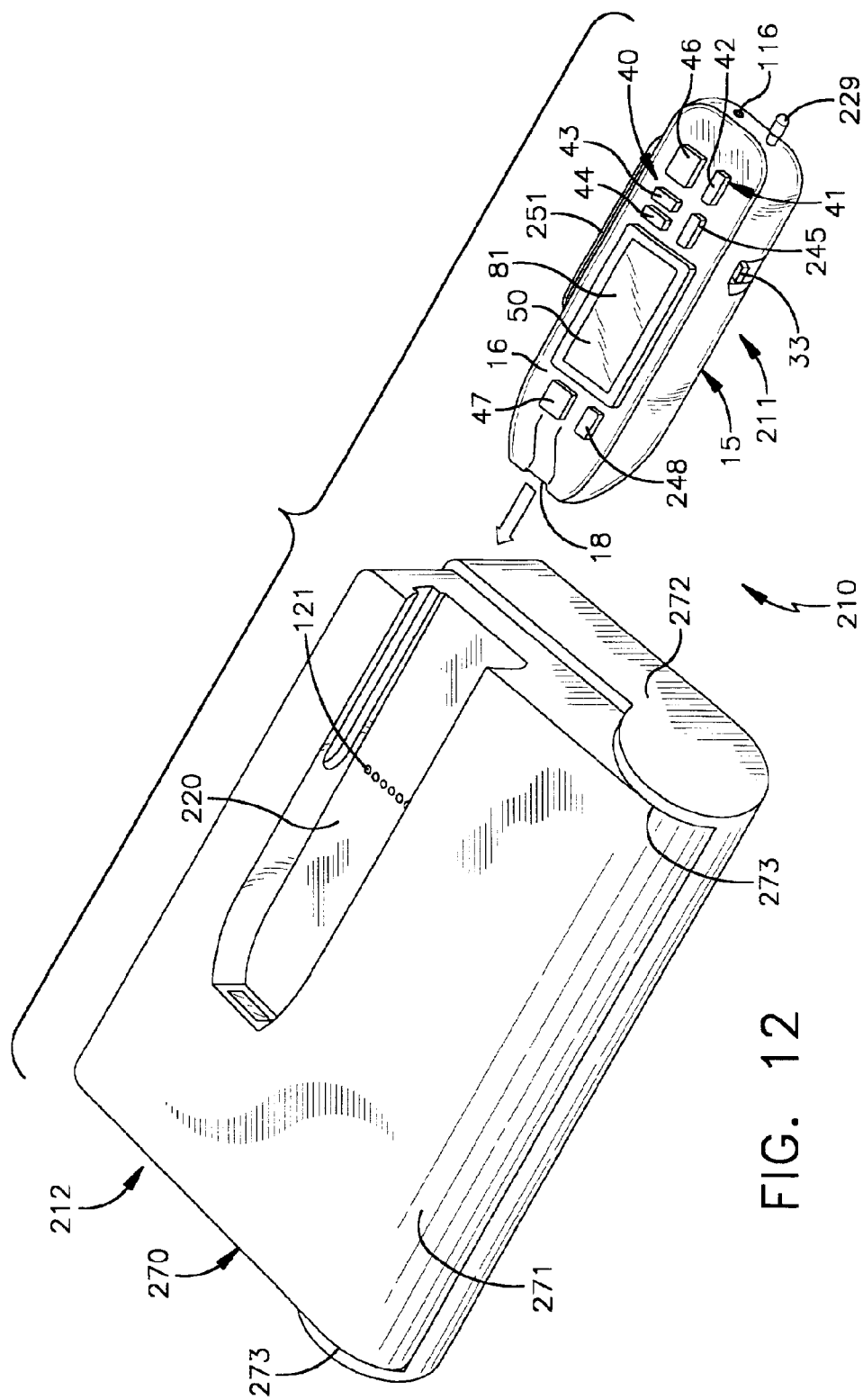
FIG. 12 is an exploded perspective view of the modified, exemplary pocket unit shown in FIGS. 12 and 13 oriented for engagement with a mating cradle in the exemplary homebase station shown in FIG. 11. The homebase station clam shell housing is shown in a closed orientation.
Figure 14:
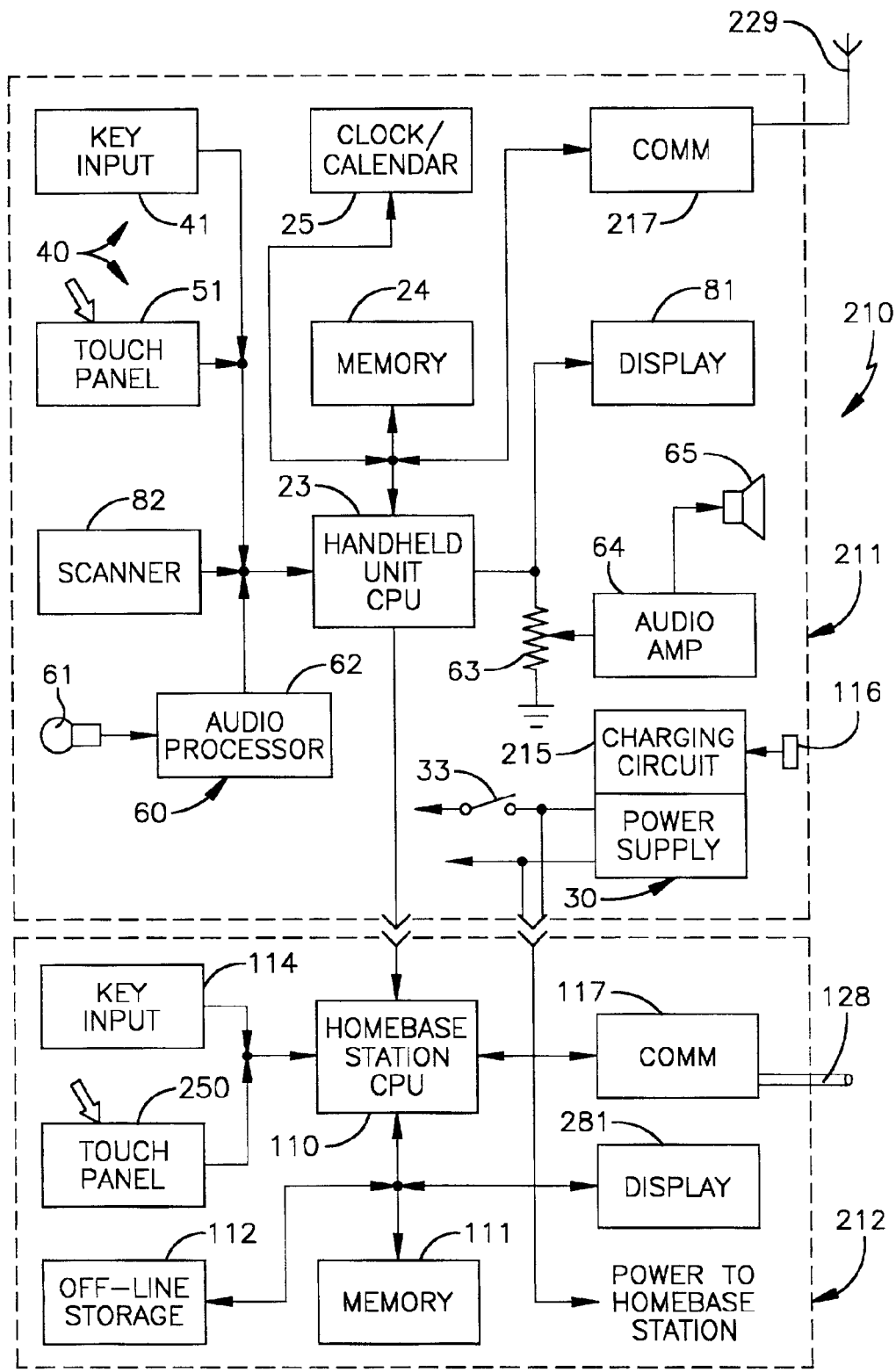
FIG. 14 is a block diagram of the functional components of the exemplary pocket unit shown in FIGS. 12 and 13 and the exemplary homebase station shown in FIG. 11.

Pocket unit 211, best seen in the top perspective view of FIG. 12, the bottom view of FIG. 13, and the block diagram of FIG. 14, includes a radio frequency (RF) or other wireless communication circuit (block 217 in FIG. 14) and accompanying telescopic or other suitable antenna 229 to be utilized as a standalone, handheld mobile voice and data telephone. Microphone 61, speaker 65, microphone sound aperture 66, and speaker sound aperture 67 may be positioned within pocket unit 211 to allow the user to hold and operate pocket unit 211 as a conventional telephone handset with speaker sound aperture 67 in proximity to an ear of the user and with microphone sound aperture 66 in proximity to one side of the user's mouth. A charging circuit 215 (shown in FIG. 14) together with its attendant external jack 116 (shown in FIGS. 12 and 14) may be included within pocket unit 211.

Other minor modifications to portable unit 11 may further facilitate inclusion of wireless communication functionality into pocket unit 211. For example, the combination shirt pocket clip and removable stylus 251 may be resized and relocated to a side of pocket unit 211. Also, certain of the input keys may provide access to telephone features, in addition to other ascribed function. Thus, for example, touch key 248 may also actuate a phone function menu on the display, and erase key 245 may stop or end a telephone call or other telephone operations.

Figure 11:
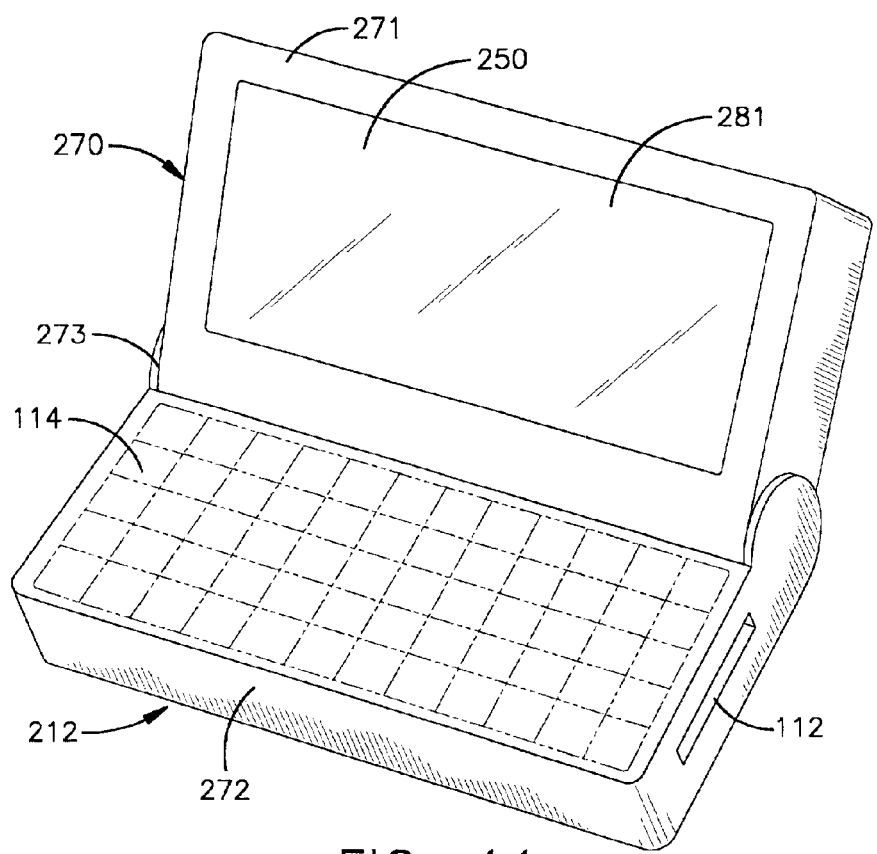
FIG. 11 is a perspective view of another exemplary portable, homebase station in accordance with the present invention for utilization with a modified, exemplary pocket unit shown in FIGS. 12 and 13. The homebase station includes a clam shell housing shown in an opened orientation.

Homebase station 212, best seen in the perspective view of FIG. 11, the top perspective view of FIG. 12, and the block diagram of FIG. 14, includes a notebook style housing such as a clam shell 270 having top housing component 271 and bottom housing component 272 which the user may pivot between open and close positions about a hinge 273. A display 281 carried in top housing component 271 and input keys 114 carried in bottom housing component 272 are accessible to the user when clam shell 270 is open.

The exterior side of top housing component 271 includes a recessed cradle 220 to receive pocket unit 211 in only one orientation, as with the embodiment of FIGS. 1 through 9. When pocket unit 211 is seated within cradle 220, connectors 121 and 122 are in electrical engagement.

Homebase station display 281 is preferably sized to facilitate an acceptable visual interface for the applications desired for execution by device 210, including, for example, Internet browsing, e-mail communication, and other text or data manipulation. In this manner pocket unit 211 display 281 may be kept small and lightweight without limiting the functionality of device 210.

Homebase station 212 is preferably as thin and lightweight as possible. In furtherance thereof, top housing component 271 may be minimally dimensioned to carry display 281, and bottom housing component 272 minimally dimensioned to carry input keys 114. Moreover, inasmuch as wireless communication circuitry and a charging circuit are furnished within pocket unit 211, they need not be duplicated within homebase station 212, further reducing the latter's size and weight requirements. Homebase station 212 may obtain its operating power from the charging circuit 215 and/or power supply 30 within pocket unit 211 when it is engaged with homebase station 212 as herein explained. A resistive touch panel 250 or other suitable tactile input device may be included in homebase station 212 where written input is necessary or desirable for user applications. Other palmtop computer or personal digital assistant features such as a floppy-drive 112 or other off-line storage device may be included where its additional space and weight needs are acceptable to the user.

The procedure for physical engagement and disengagement of pocket unit 211 with cradle 220 may occur with clam shell housing 270 closed or open, and is the same as described hereinbefore for engagement and disengagement of portable unit 11 with homebase station 12.

Where keyboard input is unnecessary or undesirable in homebase station 210 for the user's applications, it may be eliminated, leaving only the larger display 281 as depicted in the front perspective view of FIG. 11.

It should now be appreciated that devices 10 and 210 allow messages and reminders in a variety of sensory modes and in a housing that is portable, handheld and adapted for convenient carry in a shirt-pocket. Devices 10 and 210 also permit the non-sequential selective playback and modification of messages and reminders, and facilitates understanding, learning and use by, among other things, inclusion of a selectively detachable stylus and touch panel. Device 210 seamlessly allows users the added functionality of a cellular or other portable telephone device.

Inasmuch as the present invention is subject to variations, modifications and changes in detail, some of which have been expressly stated herein, it is intended that all matter described throughout this entire specification or shown in the accompanying drawings be interpreted as illustrative and not in a limiting sense. It should thus be evident that a device constructed according to the concept of the present invention, and reasonably equivalent thereto, will accomplish the objects of the present invention and otherwise substantially improve the art relating to devices for personal organization and messaging.

What is claimed is:

1. A personal organizer and messaging device, comprising a handheld unit dimensioned for handheld grasping and carrying a substantially within a shirt pocket including:
- audio input means for receiving and recording an audio message and generating a representative audio message signal;
- memory means for storing said audio message signal;
- processor means for controlling the receipt of said audio message signal, storing said audio message signal, and non-sequentially selectively recalling said audio message signal;
- audio output means for receiving said non sequentially selectively recalled audio message signal and for playing back said non-sequentially selectively recalled audio message;
- a touch panel;
- a handheld housing for carrying the touch panel, audio input means, the memory means, the processor means and the audio output means; and
- wherein said non-sequential selective recall of an audio message is accomplished by engagement with said touch panel.

2. A personal organizer and messaging device, comprising a handheld unit dimensioned for handheld grasping and carrying substantially within a shirt pocket including:
- audio input means for receiving and recording an audio message and generating a representative audio message signal;
- memory means for storing said audio message signal;
- processor means for controlling the receipt of said audio message signal, storing said audio message signal, and non-sequentially selectively recalling said audio message signal;
- audio output means for receiving said non-sequentially selectively recalled audio message signal and for playing back said non-sequentially selectively recalled audio message;
- a handheld housing for carrying the audio input means, the memory means, the processor means and the audio output means; and
- further comprising writing means for receiving a written message and generating a written message signal; and in which said processor means digitally records said written message, and non-sequentially selectively recalls for playback said written message: and display means which displays said recalled written message.

3. A device, as set forth in claim 2, further including a portable station including an auxiliary display, said portable station being in selective engagement with said handheld unit; wherein said portable station includes a housing having a first side and a second side, said auxiliary display being visible from said first side, and said second side including a cradle receiving said unit; and wherein said portable station housing includes a first housing component carrying said auxiliary display, and a second housing component including a plurality of keys, said first housing component and said second housing component movable between open and closed positions.

4. A device as set forth in claim 2, further including a homebase station for transmitting messages to and receiving messages from said handheld housing, said handheld housing means and said homebase station means in station means in selective operative communication.

5. The device of claim 1 further including a portable station including an auxiliary display, said portable station in selective engagement with said handheld unit.

6. A device, as set forth in claim 5, wherein said portable station includes a housing having a first side and a second side, said auxiliary display visible from said first side, and said second side includes a cradle receiving said unit.

7. A device, as set forth in claim 6, wherein said housing includes a first housing component carrying said auxiliary display, and a second housing component including a plurality of keys, said first housing component and said second housing component movable between open and closed positions.

8. A device, as set forth in claim 7, wherein said housing further includes a hinge, and said first housing component and said second housing component open and close about said hinge.

9. The device of claim 2 further including a portable station including an auxiliary display, said portable station in selective engagement with said unit.

10. A device, as set forth in claim 9, wherein said portable station includes a housing having a first side and a second side, said auxiliary display visible from said first side, and said second side includes a cradle receiving said unit.

11. A device, as set forth in claim 10, wherein said housing includes a first housing component carrying said auxiliary display, and a second housing component including a plurality of keys, said first housing component and said second housing component movable between open and closed positions.

12. A device, as set forth in claim 11, wherein said housing further includes a hinge, and said first housing component and said second housing component open and close about said hinge.

13. A device, as set forth in claim 2, wherein said handheld unit further includes a wireless communication circuit, said handheld housing carrying said wireless communication circuit.

14. A device, as set forth in claim 13, wherein said wireless communication circuit is a cellular telephone communication circuit.

15. A device, as set forth in claim 14, further including a portable station including an auxiliary display, said portable station in selective engagement with said unit.

16. A device, as set forth in claim 15, wherein said portable station includes a housing having a first side and a second side, said auxiliary display visible from said first side, and said second side includes a cradle receiving said unit.

17. A device, as set forth in claim 16, wherein said housing includes a first housing component carrying said auxiliary display, and a second housing component including a plurality of keys, said first housing component and said second housing component movable between open and closed positions.

18. A device, as set forth in claim 17, wherein said housing further includes a hinge, and said first housing component and said second housing component open and close about said hinge.

19. A device as set forth in claim 1 in which said engagement is accomplished using a detachably mounted stylus.

20. A device as set forth in claim 1 further including a display means for indicating the presence of at least one stored audio message signal.

21. A device as set forth in claim 20 in which said display means is positioned beneath said touch panel.

22. A device, as set forth in claim 1, further including a homebase station for transmitting messages to and receiving messages from said handheld housing, said handheld housing means and said homebase station in selective operative communication.

23. A device as set forth in claim 22 in which said homebase further includes a communication circuit for transmitting messages to and receiving messages from external sources.

24. A device as set forth in claim 2, in which said display means is positioned beneath said writing means for receiving and displaying said non-sequentially and selectively recalled written message through said writing means.

25. A device as set forth in claim 24 in which said writing means is a touch panel.

26. A device, as set forth in claim 1, wherein said handheld unit further includes a wireless communication circuit, said handheld housing carrying said wireless communication circuit.

* * * * *

UNITED STATES PATENT AND TRADEMARK OFFICE
CERTIFICATE OF CORRECTION

PATENT NO. : 6,961,004 B2
APPLICATION NO. : 09/883463
DATED : November 1, 2005
INVENTOR(S) : Rajendra Kumar Page 1 of 1

It is certified that error appears in the above-identified patent and that said Letters Patent is hereby corrected as shown below:

In Bibliography Data INID Code (63), Related U.S. Application Data, the patent document recites:

"Continuation-in-part of application number 09/057,075, filed on Apr. 8, 1998, which is a continuation of application No. 08/950,212, filed on Oct. 14, 1997...".

This section should read:

--Continuation of application number 09/057,075, filed on Apr. 8, 1998, which is a continuation-in-part of application No. 08/950,212, filed on Oct. 14, 1997...--.

In column 1, beginning at line 6, the patent document recites:

"The present application is a continuation-in-part of patent application Ser. No. 09/057,075 filed Apr. 8, 1998 which is a continuation of Ser. No. 08/950,212, filed Oct. 14, 1997,..."

This section should read:

--The present application is a continuation of patent application Ser. No. 09/057,075 filed Apr. 8, 1998 which is a continuation of Ser. No. 08/950,212, filed Oct. 14, 1997,...--

Signed and Sealed this

Eighteenth Day of December, 2007

JON W. DUDAS
*Director of the United States Patent and Trademark Office*